United States Patent [19]

Gotou

[11] Patent Number: 4,933,586

[45] Date of Patent: Jun. 12, 1990

[54] D.C. ROTARY ELECTRICAL MACHINE

[75] Inventor: Takeo Gotou, Himeji, Japan

[73] Assignee: Mitsubishi Denki Kabushiki Kaisha, Japan

[21] Appl. No.: 802,378

[22] Filed: Nov. 27, 1985

[30] Foreign Application Priority Data

Nov. 30, 1984 [JP] Japan .................... 59-182903

[51] Int. Cl.$^5$ .............................................. H02K 3/00
[52] U.S. Cl. .................................. 310/198; 310/154; 310/206; 310/207; 310/234
[58] Field of Search .............. 310/46, 154, 198, 200, 310/201, 202, 203, 204, 205, 206, 207, 234, 177, 248

[56] References Cited

U.S. PATENT DOCUMENTS

| | | | |
|---|---|---|---|
| 2,103,166 | 12/1937 | Morrill | 310/206 |
| 2,272,749 | 2/1942 | Lane | 310/206 |
| 2,598,464 | 5/1952 | Thomas | 310/206 |
| 4,292,559 | 9/1981 | Auinger | 310/206 |
| 4,437,029 | 3/1984 | Ban | 310/198 |
| 4,447,751 | 5/1984 | Ban | 310/154 |
| 4,507,565 | 2/1985 | Hamano | |
| 4,583,016 | 4/1986 | Ban | 310/198 |

FOREIGN PATENT DOCUMENTS 1237988 7/1971 United Kingdom .

OTHER PUBLICATIONS

"Automobile Electrical Equipment", Young et al., London Iliffe Books Ltd, 1933, pp. 102-105.

Primary Examiner—R. Skudy
Attorney, Agent, or Firm—Leydig, Voit & Mayer

[57] ABSTRACT

A D.C. rotary electric machine comprises an armature winding having a plurality of unit coils shifted from each other by a predetermined electrical angle and a commutator having a plurality of commutator segments. Each unit coil includes a pair of coil sides and is connected between two commutator segments. The unit coils are positioned with respect to the commutator segments so that an axial line passing through the midpoint between the pair of coil sides of each unit coil is circumferentially advanced by a predetermined angle with respect to an axial line passing through the midpoint between the commutator segments to which the coil unit is connected.

3 Claims, 2 Drawing Sheets

D.C. ROTARY ELECTRICAL MACHINE

BACKGROUND OF THE INVENTION

This invention relates to direct current rotary electrical machines such as motors or generators, and more particularly to an improvement in the rectification thereof.

A direct current motor will be explained as one example of a conventional generally known direct current rotary electrical machine in reference to FIG. 1 (a developmental view of an electric circuit thereof) and FIG. 2. In the drawings, a stator having a field magnetic pole 1 comprising a permanent magnet is disposed opposite an armature 2 which is comprised of armature windings 3, an armature core 4, a commutator 5 etc., as disclosed below. The symbol P denotes a magnetic neutral plane. The armature windings 3 is provided by unit coils A lap wound a predetermined number of turns having a pair of coil sides $3a$ and coil ends $3P_1$, $3P_2$, $3u$ disposed within a slot of armature core 4. The commutator 5 is comprised of a plurality of commutator segments $5a$, and two coil ends ($3P_1$, $3P_2$) opposite to the pole 1 of the unit coils A of the armature windings are individually connected to two corresponding segments. A brush 6 is in rubbing contact with the commutator 5.

In the conventional machine as constructed above, when the armature winding 3 is energized through the brush 6, a current I flows to each of the coil sides $3a$ in the direction of the arrows and the armature 2 is rotated in direction N by the electromagnetic operation between the field flux from the permanent magnet 1 and the field flux due to the current flowing to the coil of the armature 2.

Referring to the rectification based on the unit coil (A) as shown by the solid line in FIG. 2, the current amount thereof changes between $-Ic$ and $+Ic$ according to the change of contact area between each of the commutator segments $5a$ and the brush 6 in accordance with the revolution of the armature 2.

Here, the reference symbol P shows the timing point where each of a pair of coil sides $3a$ is positioned on a magnetic neutral plane. Ideally, it is desirable that the current value be in the vicinity of zero at this point P as shown by the dashed line in FIG. 2. However, primarily because of such factors as the self inductance of the unit coils A, in reality this is delayed as shown by the solid line in FIG. 2 so that the torque and output characteristics, etc. are reduced.

So, in the related art, the position of the brush 6 in relation to the field magnetic pole is shifted, for example, as depicted by the dotted line of FIG. 1. This results in the following demerits. Namely, since the direction of shift of the brush etc. in relation to the field magnetic pole differs according to such factors as the direction of rotation of the armature, or whether the machine is a motor or a generator, two kinds of fixing members holding the brush etc. must be prepared in accordance with the direction of shift of the brush 6 and the two types cannot be used in place of one another and further, if an interchangeable part is attempted to be manufactured it would have to be increased in size due to problems with the positional relation with other parts resulting in the demerit that the machine becomes large in size.

SUMMARY OF THE INVENTION

This invention is intended to eliminate the above disadvantages.

An object of this invention is therefore to shift the positioning of the commutator so that the magnetic neutral plane is positioned where the value of the current flowing to unit coils of an armature winding is zero.

Another object of this invention is to provide a direct current rotary electrical machine having a excellent electrical characteristics.

With the above objects in view, a D.C. rotary electric machine of this invention comprises an armature windings (7) having a plurality of unit coils (A) shifted from each other by a predetermined electrical angle and a commutator (8) having a plurality of commutator segments ($8a$). Each unit coil includes a pair of coil sides ($7a$) and is connected between two commutator segments ($8a$). The unit coils (A) are positioned with respect to the commutator segments ($8a$) so that an axial line passing in through the midpoint between the pair of coil sides ($7a$) of each unit coil is circumferentially advanced by a predetermined angle ($\theta$) with respect to an axial line passing in through the midpoint between two commutator segments ($8a$) to which the coil unit is connected.

PREFERRED EMBODIMENT OF THE INVENTION

Figure 1:
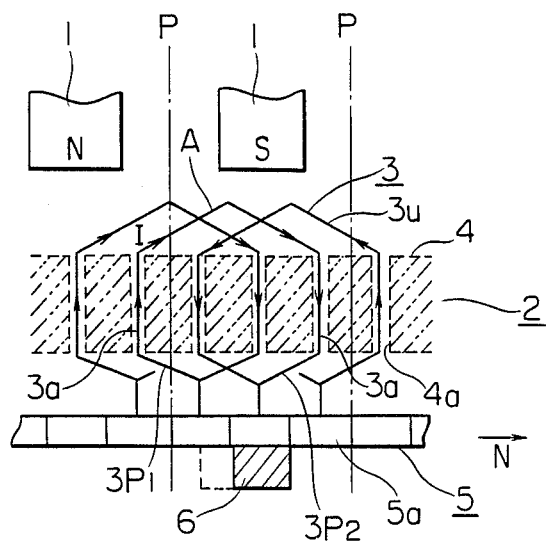
FIG. 1 is a developmental view showing a conventional machine.
Figure 2:
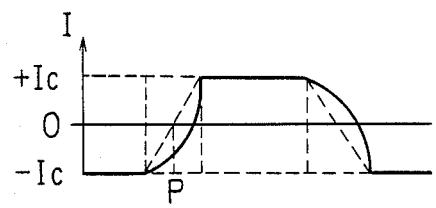
FIG. 2 is a rectification curve of a current flowing to the armature windings of FIG. 1.
Figure 3:
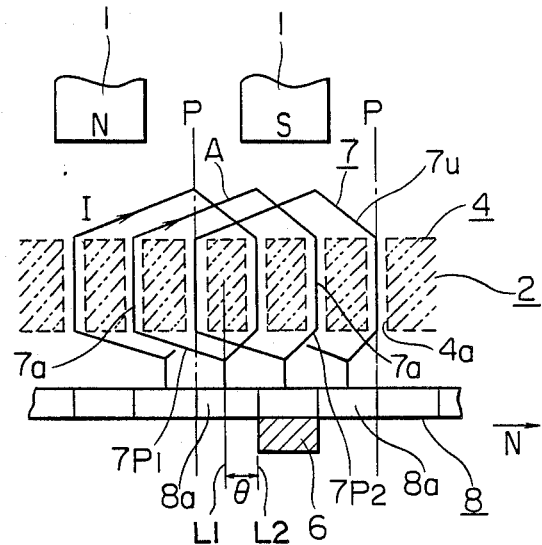
FIG. 3 is a developmental view showing an embodiment of this invention.

An embodiment of this invention will be explained below with reference to FIGS. 3 and 4. In the drawings, an armature winding 7 comprises a plurality of unit coils (A) which have coil sides $7a$ and coil ends $7P_1$, $7P_2$, $7u$.

The coil ends $7P_1$, $7F_2$ are connected to two corresponding commutator segments $8a$. The armature winding 7 is wound in a lap style and is disposed so that an axial line L1 passing through the midpoint between the pair of coil sides $7a$ of each coil thereof is circumferentially disposed by an angle ($\theta$) relative to an axial line L2 passing through the midpoint between the corresponding pair of commutator segments $8a$.

The other elements are the same as that of a conventional machine, so an explanation thereof will be omitted.

Figure 4:
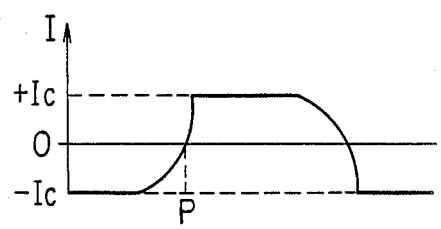
FIG. 4 is a rectification curve of a current flowing to the armature windings of FIG. 3.

In the above construction, since the pair of commutator segments $8a$ are advancedly displaced by an angle ($\theta$) in the rotating direction relative to the coil sides $7a$ the value of the current I becomes zero at the point P in FIG. 4. Namely, the current I flowing to the armature winding is approximately zero at the point P of the magnetic neutral plane. Here, as it can easily be realized to circumferencially displace the armature windings 7 relative to a commutator 8 in a manufacturing process without regard to the direction of displacement it is possible to apply one part for another and also to use general parts in replacement thereof.

Figure 5:
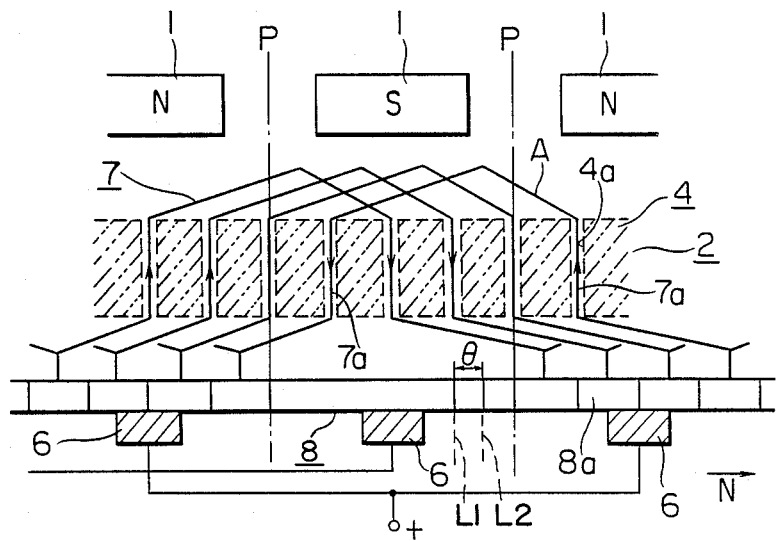
FIG. 5 is a developmental view showing another embodiment of this invention.

FIG. 5 shows another embodiment of this invention. In the drawing, the armature windings are wave-wound. This configuration of FIG. 5 also has the same advantageous effects as the above embodiment in FIG. 3.

What is claimed is:

1. A D.C. rotary electric machine comprising:
    a stator including magnetic poles;
    an armature rotatable relative to said stator and including an armature winding having a plurality of unit coils shifted form each other by a predetermined electrical angle and a commutator having a plurality of commutator segments, each of said unit coils including a pair of coil sides connected between two commutator segments;
    at least one brush in rubbing contact with said commutator segments; and
    said unit coils being positioned with respect to said commutator segments so that an axial line passing through a midpoint between the pair of coil sides of each unit coil is circumferentially advanced by a predetermined angle from an axial line passing through a midpoint between the commutator segments to which the coil unit is connected.

2. A D.C. rotary machine as claimed in claim 1, wherein said armature winding is lap-wound.

3. A D.C. rotary machine as claimed in claim 1, wherein said armature winding is wave-wound.

* * * * *